(12) United States Patent
Zhang

(10) Patent No.: US 11,708,107 B2
(45) Date of Patent: Jul. 25, 2023

(54) DRIFT CAR FOR CHILDREN

(71) Applicant: Jiaxing JinTong Electronics Co., Ltd., Zhejiang (CN)

(72) Inventor: Qiang Zhang, Zhejiang (CN)

(73) Assignee: Jiaxing JinTong Electronics Co., Ltd., Jiaxing (CN)

( * ) Notice: Subject to any disclaimer, the term of this patent is extended or adjusted under 35 U.S.C. 154(b) by 139 days.

(21) Appl. No.: 17/524,734

(22) Filed: Nov. 11, 2021

(65) Prior Publication Data

US 2023/0043410 A1 Feb. 9, 2023

(30) Foreign Application Priority Data

Aug. 7, 2021 (CN) .......................... 202121834903.1

(51) Int. Cl.
```
B60K 1/02      (2006.01)
B62D 9/00      (2006.01)
B62D 31/00     (2006.01)
B62D 5/04      (2006.01)
B62D 6/00      (2006.01)
G05D 1/00      (2006.01)
```

(52) U.S. Cl.
CPC ............... B62D 9/002 (2013.01); B60K 1/02 (2013.01); B62D 5/046 (2013.01); B62D 5/0418 (2013.01); B62D 6/003 (2013.01); B62D 31/003 (2013.01); G05D 1/0016 (2013.01)

(58) Field of Classification Search
CPC ...... B62D 9/002; B62D 5/0418; B62D 5/046; B62D 6/003; B62D 31/003; B60K 1/02; G05D 1/0016
See application file for complete search history.

(56) References Cited

U.S. PATENT DOCUMENTS 8,038,504 B1 * 10/2011 Wong ..................... A63H 30/04
                                                446/454
2023/0043410 A1 * 2/2023 Zhang .................... B62D 9/002

FOREIGN PATENT DOCUMENTS

| CA | 2913812 C | * 5/2021 | ...... B60W 30/18118 |
| CN | 204846205 U | * 12/2015 | |
| CN | 210162184 U | * 3/2020 | |
| CN | 215436744 U | * 1/2022 | ............... B60K 1/02 |

* cited by examiner

Primary Examiner — Jacob B Meyer

(57) ABSTRACT

Provided is a drift car for children, including a car body, a driving system and a control system, the driving system includes a front wheel set, a rear wheel set and a motor set on the car body, the front wheel set includes a left front wheel and a right front wheel, and the rear wheel set includes a left rear wheel and a right rear wheel, the control system includes an on-board controller arranged in the car body, and the motor set includes a left motor and a right motor, in which the left motor is connected to the left front wheel or the left rear wheel, the right motor is connected to the right front wheel or the right rear wheel, and the left and right motors are both connected to the on-board controller; the controller system also includes a drift trigger switch connecting to the on-board controller.

10 Claims, 7 Drawing Sheets

DRIFT CAR FOR CHILDREN

CROSS-REFERENCE TO RELATED APPLICATION

This application is based on and claims the priority to Chinese patent application Ser. No. 202121834903.1, filed on Aug. 7, 2021. The entirety of the above-mentioned patent application is hereby incorporated by reference herein and made a part of this specification.

TECHNICAL FIELD

The present application relates to a field of children car and in particular, relates to a drift car for children.

BACKGROUND ART

Children electric car is motor-driven toy cars that children can sit and drive, which has a beautiful appearance, is safe to drive, and has interestingness, so as to be suitable for children to play. In order to diversify the functions of children cars as toys, more and more children cars include drift function, that is, the children car takes a controlled drift action when driving.

The existing children car realizes drift generally in two ways. One is to use high-power motor in rear wheels. In the drift mode, the rear wheels rotate at full speed and slip when front wheels turn to cause idling and generate lateral force, so as to realize drift, which leads to a high cost due to the use of high-power motor. Another is to turn front wheels sharply after the children car reaches a faster speed, which results in the shift of the center of gravity of the children car to generate tail flicking drift. However, the children car needs to occupy a larger site to achieve a faster speed and sharp turn, which limits the drift of children car.

SUMMARY

In order to reduce the limitation of the drift of the children car, the present application provides a drift car for children.

The drift car for children in the present application adopts following technical solution:

A drift car for children includes a car body, a driving system and a control system, in which the driving system includes a front wheel set, a rear wheel set and a motor set arranged in the car body, in which the front wheel set includes a left front wheel and a right front wheel, and the rear wheel set includes a left rear wheel and a right rear wheel, the control system includes an on-board controller arranged in the car body, and the motor set includes a left motor and a right motor, in which the left motor is connected to the left front wheel or the left rear wheel, the right motor is connected to the right front wheel or the right rear wheel, and the left and right motors are both connected to the on-board controller; the controller system also includes a drift trigger switch connecting to the on-board controller, in which the drift trigger switch outputs a drift signal and the on-board controller responds to the drift signal and controls the left and right motors to rotate in opposite directions.

With the above technical solution, the drift trigger switch is triggered by the user to output a corresponding drift signal, the on-board controller receives and responds to the drift signal, and correspondingly controls the left and right motors to rotate in opposite directions according to the drift signal to generate a torque so as to realize the drift. Because the torque is generated by opposite rotation directions of the left and right motors, the efficiency is high. Compared with the drift realized by the slip idling of two rear wheels, the present application can use the motor with smaller power, so as to reduce the cost. Compared with the way that the children car reaches a faster speed and drifts by turning the front wheel sharply, the present application can directly take the drift action in the static state, so that the car body can simulate the real drift state in a small field and reduce the drift limitations of the children car. In addition, compared with the above two methods, the present application requires no driving skill, the children car can realize a basically controlled drift action through simple methods such as buttons, reducing the operation difficulty for underage children, and realizing drift through remote control, which increases the interaction between parents and children and greatly improves the entertainment of drift function of the children car.

In some embodiments, the left motor is connected to the left rear wheel and the right motor is connected to the right rear wheel.

With the above technical solution, the left motor controls the rotation direction of the left rear wheel and the right motor controls the rotation direction of the right rear wheel. The on-board controller controls the left and right motors according to the drift signal to drive the left and right rear wheels to rotate in the opposite directions so as to realize the drift easily.

In some embodiments, the drift car includes two left motors, and the two left motors are connected to the left front wheel and left rear wheel respectively. The drift car includes two right motors, and the two right motors are connected to the right front wheel and right rear wheel respectively.

With the above technical solution, two left motors rotate in the same direction and two right motors rotate in the same direction, while the on-board controls two left motors and two right motors to rotate in the opposite directions to generate a torque to realize the drift of the car body. The present application is suitable for the four-wheel-drive children car in the current market, and can realize drift only by the motor with smaller power, which further reduces the cost.

In some embodiments, the drift trigger switch includes: a left drift trigger switch, which is provided on the car body and connected to the input terminal of the on-board controller, and outputs a left drift signal; the on-board controller responds to the left drift signal and controls the left motor to rotate reversely and the right motor forwards; and a right drift trigger switch, which is provided on the car body and connected to the input terminal of the on-board controller, and outputs a right drift signal; the on-board controller responds to the right drift signal and controls the right motor to rotate reversely and the left motor forwards.

With the above technical solution, the left drift trigger switch is triggered by the user to output a left drift signal. The on-board controller controls the left motor to rotate reversely and the right motor forwards to generate a torque so that the car body drift counterclockwise. And the right trigger switch is triggered by the user to output a right drift signal. The on-board controller controls the right motor to rotate reversely and the left motor forwards to generate a torque so that the car body drift clockwise, which simulate the real drift state.

In some embodiments, the drift trigger switch includes a remote control, which is wirelessly adapted and connected to the on-board controller, the remote control includes a left drift remote button, which outputs a left drift remote signal and the on-board controller responds to the left drift remote signal and controls the left motor to rotate reversely and the right motor forwards, and the remote control also includes a right drift remote button, which outputs a right drift remote signal and the on-board controller responds to the right drift remote signal and controls the right motor to rotate reversely and the left motor forwards.

With the above technical solution, the user can control the car body by using remote control. When the user presses the left drift remote button, the remote control outputs a left drift remote signal, the on-board controller controls the left motor to rotate reversely and the right motor forwards to generate a torque so that the car body drift counterclockwise. When the user presses the right drift remote button, the remote control outputs a right drift remote signal, the on-board controller controls the right motor to rotate reversely and the left motor forwards to generate a torque so that the car body drift clockwise.

In some embodiments, the car body includes a drift mode switch, which is connected to the on-board controller and is used for outputting a drift mode switching signal, and the on-board controller responds to the drift mode switching signal and judges whether to respond to the drift signal from the drift trigger switch.

With the above technical solution, by providing the drift mode switch, when the user leads the children to an open environment suitable for drift, the user can turn on the drift mode by turning on the drift mode switch, the on-board controller can respond to the drift signal sent by the drift trigger switch, so that the children can drift the car body by operating the drift trigger switch, which improves the safety of the children car.

In some embodiments, two sides of the car body are fixedly connected with fixing blocks respectively, and the two fixing blocks are positioned at sides of the left and right front wheels away from the center of the car body respectively, the fixing block is hollow and has an opening at one end facing the ground, a lifting block slidably penetrates through an inner cavity of the fixing block, and a universal wheel is fixedly connected to at the end of the lifting block extending out of the opening of the fixing block, the fixing block is fixedly connected to a supporting motor, the fixing block includes a linkage assembly, in which the supporting motor is connected to the linkage assembly, the linkage assembly is connected to the lifting block and the on-board controller is connected to the supporting motor, the corresponding supporting motor is controlled to be on or off according to the drift signal, the universal wheel is driven by the linkage assembly to abut against the ground until the left or right front wheel is off the ground.

With the above technical solution, when the on-board controller correspondingly controls the rotation directions of the left and right motors according to left or right drift signal, the supporting motor at the side of the left or right front wheel is correspondingly controlled to be on, so that the lifting block moves downwards by supporting motor through linkage assembly, and the universal wheel can be abutted against the ground. The lifting block is driven to continue moving downwards, so that the left or right front wheel closing to the universal wheel abutted against the ground is off the ground, in which the sliding friction between the left or right front wheel and the ground can transform to the rolling friction, which reduces the friction, generates the sideslipping more smoothly in the whole car body, reduces the friction loss between the left or right front wheel and the ground, and increases the service life of the left or right front wheel.

In some embodiments, the linkage assembly includes a screw rod rotatably penetrating through the inner cavity of the fixing block, the output axle of the supporting motor is fixedly connected to the screw rod, the screw rod threadingly penetrates through the lifting block, the fixing block and the lifting block are both rectangle-shaped, and an outer wall of the lifting block is abutted to an inner wall of the fixing block.

With the above technical solution, supporting motor drives the screw rod to rotate, so that the lifting block can move downwards stably along the screw rod.

In conclusion, the present application includes at least one of the following beneficial technical effects:

1. The drift trigger switch is triggered by the user to output a corresponding drift signal, the on-board controller receives and responds to the drift signal, and correspondingly controls the left and right motors to rotate in opposite directions according to the drift signal to generate a torque so as to realize the drift. Because the torque is generated by opposite the rotation directions of the left and right motors, the efficiency is high. Compared with the drift realized by the slip idling of two rear wheels, the present application can use the motor with smaller power, so as to reduce the cost. Compared with the way that the children car reaches a faster speed and drifts by turning the front wheel sharply, the present application can directly make the drift action in the static state, so that the car body can simulate the real drift state in a small field and reduce the drift limitations of the children car.

2. When the on-board controller correspondingly controls the rotation directions of the left and right motors according to left or right drift signal, the supporting motor at the side of the left or right front wheel is correspondingly controlled to be on, so that the lifting block moves downwards by supporting through linkage assembly, and the universal wheel can be abutted against the ground. The lifting block is driven to continue moving downwards, so that the left or right front wheel closing to the universal wheel abutted against the ground is off the ground, in which the sliding friction between the left or right front wheel and the ground can transform to the rolling friction, which reduces the friction, generates the sideslipping more smoothly in the whole car body, reduces the friction loss between the left or right front wheel and the ground, and increases the service life of the left or right front wheel.

DETAILED DESCRIPTION

The present application is further described in detail below in combination with FIGS. 1-7.

The embodiments of the present application provide a drift car for children. In the present application, the children car realizes moving forwards by forward rotation of the motor, and realizes moving backwards by reverse rotation of the motor.

Embodiment 1

Figure 1:
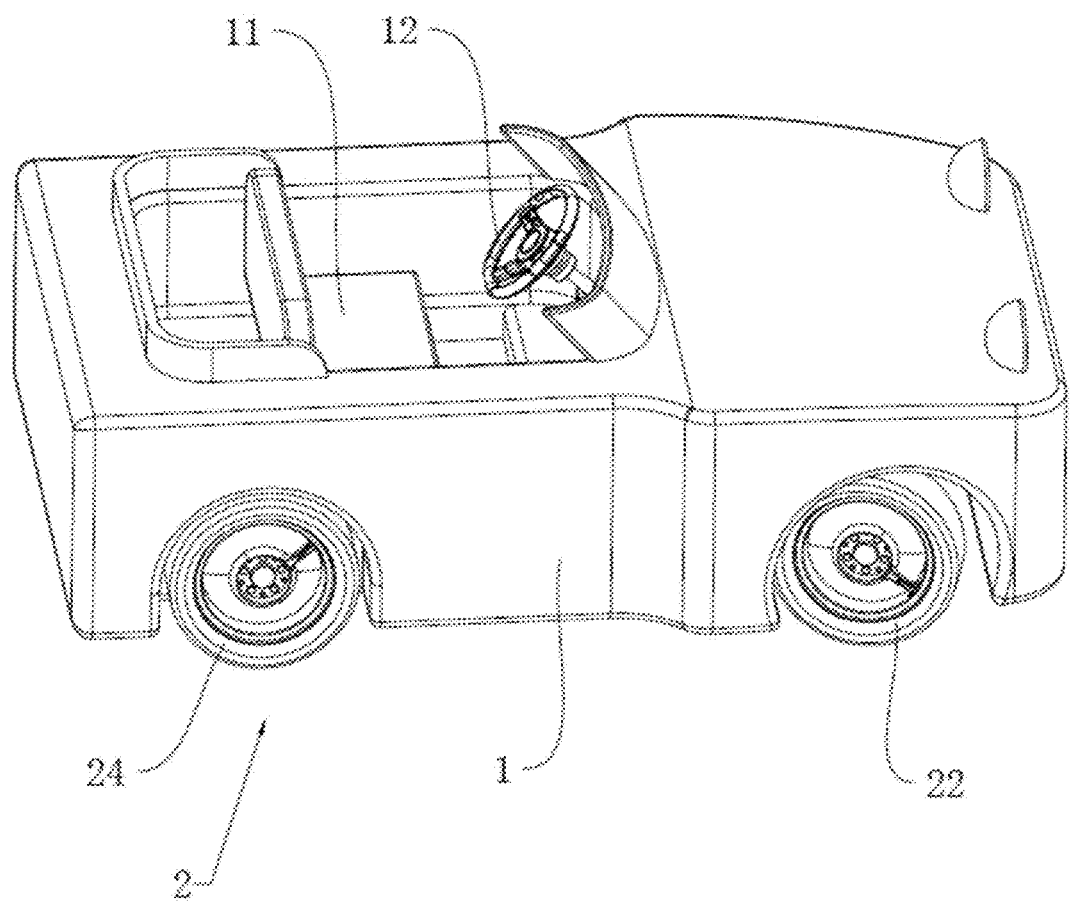
FIG. 1 is an overall structural diagram of Embodiment 1 in the present application.
Figure 2:
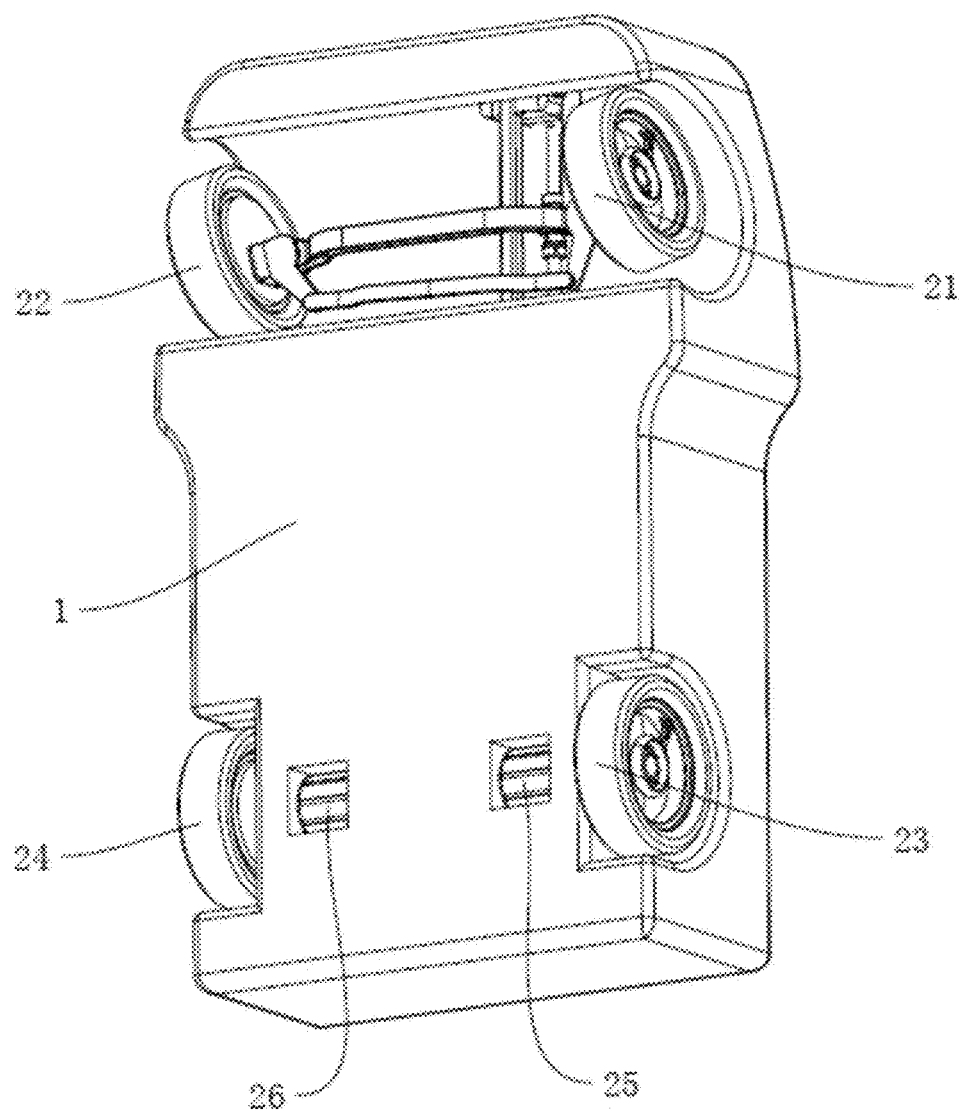
FIG. 2 is a bottom view of the car body in Embodiment 1 of the present application.
Figure 3:
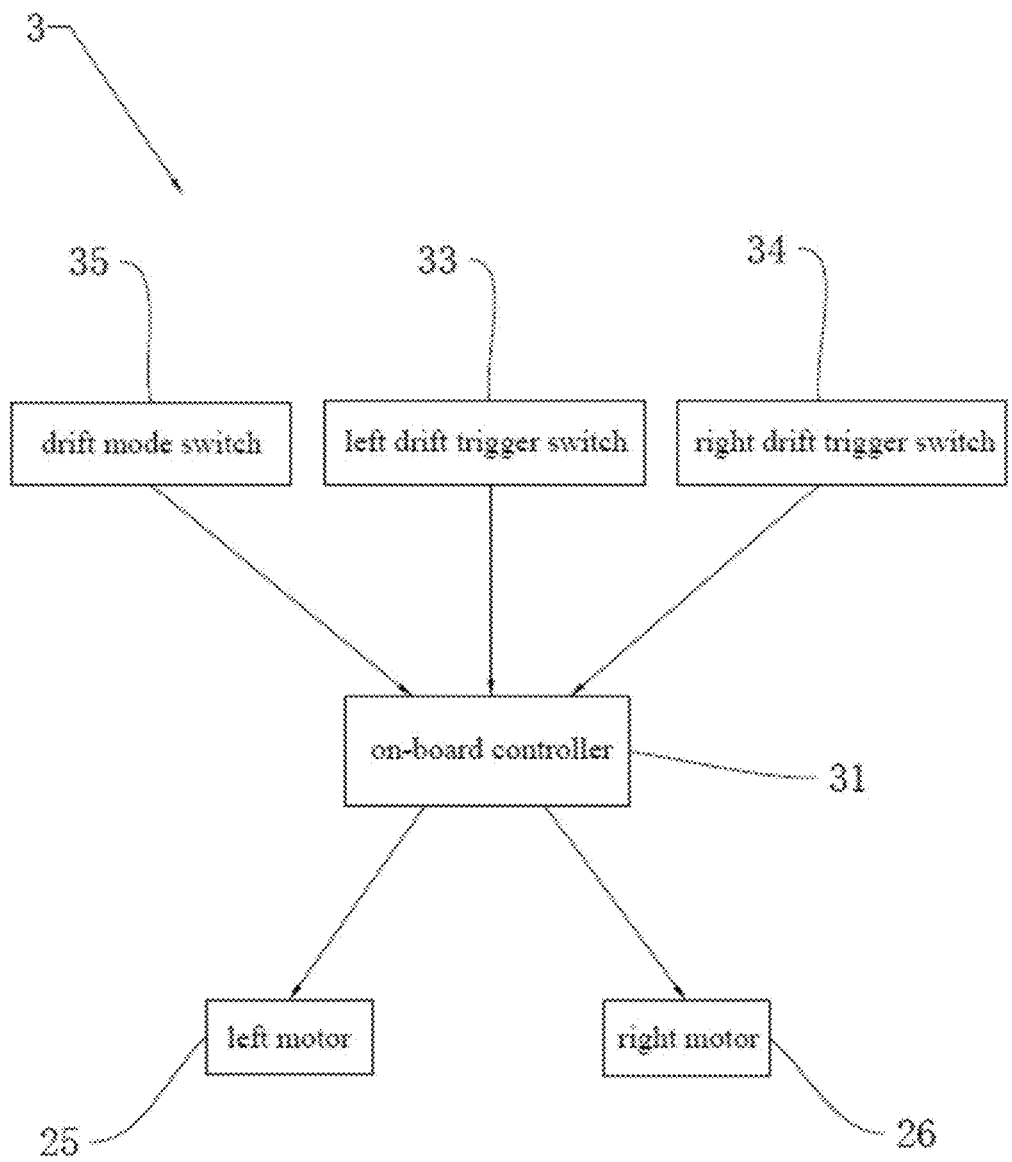
FIG. 3 is a system block diagram of the control system in Embodiment 1 of the present application.

Referring to FIG. 1, FIG. 2 and FIG. 3, a drift car for children includes a car body 1, a driving system 2 and a control system 3. The car body 1 is provided with a seat 11, is rotatably connected with a steering wheel 12 in front of the seat 11 through bearing, and is provided with an accelerator (driving pedal) under the steering wheel 12. The driving system 2 includes a front wheel set, a rear wheel set and a motor set arranged in the car body 1. The front wheel set includes a left front wheel 21 and a right front wheel 22 in the front of the car body 1, and the left front wheel 21 and right front wheel 22 are connected to the steering wheel 12 through steering axle, so that the steering wheel 12 can control the rotation directions of the left front wheel 21 and the right front wheel 22. The rear wheel set includes a left rear wheel 23 and a right rear wheel 24 in fixed connection at the rear of the car body 1 through wheel carrier. The motor set includes a left motor 25 and a right motor 26 in fixed connection at the rear of the car body 1, the output axle of the right motor 26 is fixedly connected to the wheel axle of the right rear wheel 24, and the car body 1 is provided with a power supply in fixed connection behind the seat 11 for supplying power to the left motor 25 and right motor 26. In this embodiment, the power supply adopts storage battery.

Referring to FIG. 2 and FIG. 3, the control system 3 includes a drift trigger switch and an on-board controller 31 in fixed connection with the car body 1. The on-board controller 31 is connected to an output terminal of the drift trigger switch. The on-board controller 31 is a control circuit composed of single chip microcomputer as the core. The left motor 25 and right motor 26 are both connected to the on-board controller 31, and the drift trigger switch is connected with the on-board controller 31. The drift trigger switch is used for receiving a drift instruction and outputs a drift signal, and the on-board controller 31 receives and responds to the drift signal and controls the left motor 25 and the right motor 26, so that the left rear wheel 23 and the right rear wheel 24 rotate in the opposite directions to generate a torque to realize the drift of the car body 1. The control mode of the on-board controller 31 controlling the rotation direction of the output axle of the left motor 25 and the right motor 26 is not the focus of the present application, as long as it can control the rotation directions of the left motor 25 and the right motor 26.

Figure 4:
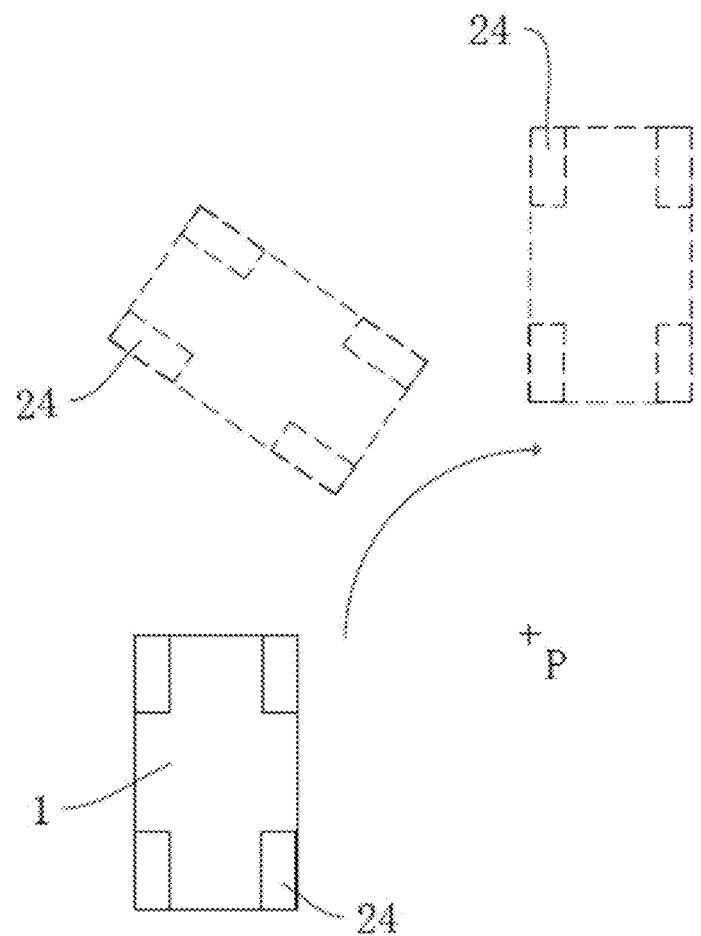
FIG. 4 is a drift trajectory schematic diagram of the right drift of the car body in Embodiment 1 of the present application in the ideal state.

Referring to FIG. 4, whether the car body 1 drifts to the left or the right, it is actually a process that the car body 1 deviates from the forward direction when moving forward and realizes left or right rotation laterally, that is, in the present application, assuming a drift center point P, the left drift or right drift of the car body 1 is a composite motion of the rotation of the car body 1 itself and the rotation of the car body 1 around the drift center point P, FIG. 4 is only an ideal state in which the car body 1 drifts to the right in the forward state. Under the condition that the drift center point P does not change, the drift trajectory of the car body 1 is simulated. While in the actual drift process of the car body 1, the position of the drift center point P may change with the actual situation.

Referring to FIG. 3, the drift trigger switch includes a left drift trigger switch 33 mounted on the car body 1, in which the left drift trigger switch 33 is connected to the input terminal of the on-board controller 31 and is used for receiving the left drift instruction from the user and outputs a left drift signal, and the on-board controller 31 responds to the left drift signal and controls the left motor 25 to rotate reversely and the right motor 26 forwards. The left drift trigger switch 33 is triggered by the user to output a left drift signal to the on-board controller 31. The on-board controller 31 receives the left drift signal and controls the left motor 25 to rotate reversely and the right motor 26 forwards at the same time. Because the rotation directions of the left rear wheel 23 and the right rear wheel 24 are opposite, a torque is generated to drive the car body 1 drifting counterclockwise, which simulates the real drift state and increases the interestingness of the children car.

Referring to FIG. 3, the drift trigger switch also includes a right drift trigger switch 34 mounted on the car body 1, in which the right drift trigger switch 34 is connected to the input terminal of the on-board controller 31 and is used for receiving the right drift instruction from the user and outputs a right drift signal, and the on-board controller 31 responds to the right drift signal and controls the right motor 26 to rotate reversely and the left motor 25 forwards. Because the rotation directions of the left rear wheel 23 and the right rear wheel 24 are opposite, a torque is generated to drive the car body 1 drifting clockwise, so as to realize the right drift of the car body 1.

In this embodiment, the left drift trigger switch 33 and the right drift trigger switch 34 can adopt two push switches, which are mounted at both sides of the steering wheel respectively. One of the push switches is manually triggered by the user to output a left or right drift signal. Or two foot-switches can be adopted, which are mounted on the car body 1 where the user's soles place. One of the foot-switches is triggered by pedaling from the user to output a left or right drift signal. In other embodiments, the left drift trigger switch 33 and the right drift trigger switch 34 can also adopt two limit switches, which are mounted on the side of the car body 1 facing the steering wheel 12. In addition, the two limit switches are located on the rotation trajectory of the steering wheel 12, and there is a distance between the limit switch and the steering wheel 12. The steering wheel 12 is provided with a contacting block for contacting the limit switch, so that when the steering wheel 12 rotates to the left or the right beyond the set angle, the end plane of the contacting block contacts the detection end of one of the limit switches to trigger the limit switch and output the left or right drift signal. At the same time, the steering wheel 12 can continue to rotate. In the present application, the set angle can be freely set according to the user's actual operation habits.

Referring to FIG. 3, the car body 1 is provided with a drift mode switch 35 on one side of the steering wheel 12. The drift mode switch 35 can adopt a push switch. The drift mode switch 35 is connected to the on-board controller 31 to output the drift mode switching signal. The on-board controller 31 responds to the drift mode switching signal, and judges whether to respond to the left drift signal and the right drift signal output by the left drift trigger switch 33 and the right drift trigger switch 34 according to the drift mode switching signal. When the user presses the drift mode switch 35, the on-board controller 31 responds to the left drift signal and the right drift signal.

The implementation principle is: When driving the children car, the user can first turn on the drift mode of the children car by turning on the drift mode switch 35, and then the user can output the left or right drift signal to the on-board controller 31 by triggering the left drift trigger switch 33 or the right drift trigger switch 34, so that the car body 1 enters the left drift or right drift state.

Embodiment 2

The difference between this embodiment and Embodiment 1 is that the drift car is provided with two left motors 25 and two right motors 26, in which two left motors 25 are connected to the left front wheel 21 and left rear wheel 23 respectively, and two right motors 26 are connected to the right front wheel 22 and right rear wheel 24 respectively, so that the children car has a four-wheel-drive structure. In addition, when the on-board controller 31 responds to the left drift signal, it controls the two left motors 25 to rotate reversely synchronously, and controls the two right motors 26 to forward synchronously, so that the rotation directions of the wheels on both sides of the car body 1 are opposite, so as to generate torque and realize the drift of the car body 1. Although this technical solution reduces the tail swing amplitude of the car body 1, due to the use of four motors, the power of one single motor required to realize drift is further reduced. Only a motor with small power is needed to realize drift of the car body 1, reducing the cost, and well cooperating with the four-wheels-drive models existing in the current market.

Embodiment 3

The difference between this embodiment and Embodiment 1 is that the drift trigger switch can also use a remote controller. The remote controller is wirelessly adopted and connected to the on-board controller 31. In addition, the remote controller is provided with a left drift remote control button, which outputs a left drift remote control signal. The on-board controller 31 responds to the left drift remote control signal and controls the left motor 25 to reverse and the right motor 26 to forward, so that the car body 1 is realized to drift to the left. The remote controller is also provided with a right drift remote control button. The right drift remote control button outputs the right drift remote control signal. The on-board controller 31 responds to the right drift remote control signal and controls the right motor 26 to reverse and the left motor 25 to forward, so that the car body 1 is realized to drift to the right. Further, the remote controller is also provided with a left steering button, a right steering button, a forward button, a backward button and a stop button, and enables the on-board controller 31 to control the car body 1 to realize left and right steering, forward and backward, braking and other actions according to the control signal sent by the remote controller.

Embodiment 4

The difference between this embodiment and Embodiment 1 is that the drift trigger switch is not only provided with a left drift trigger switch and a right drift trigger switch, but also provided with a remote controller. The remote controller is wirelessly adopted and connected to the on-board controller 31. In addition, the remote controller is provided with a left drift remote control button, which outputs a left drift remote control signal. The on-board controller 31 responds to the left drift remote control signal and controls the left motor 25 to reverse and the right motor 26 to forward, so that the car body 1 is realized to drift to the left. The remote controller is also provided with a right drift remote control button. The right drift remote control button outputs the right drift remote control signal. The on-board controller 31 responds to the right drift remote control signal and controls the right motor 26 to reverse and the left motor 25 to forward, so that the car body 1 is realized to drift to the right. Further, the remote controller is also provided with a left steering button, a right steering button, a forward button, a backward button and a stop button, and enables the on-board controller 31 to control the car body 1 to realize left and right steering, forward and backward, braking and other actions according to the control signal sent by the remote controller.

Embodiment 5

Figure 5:
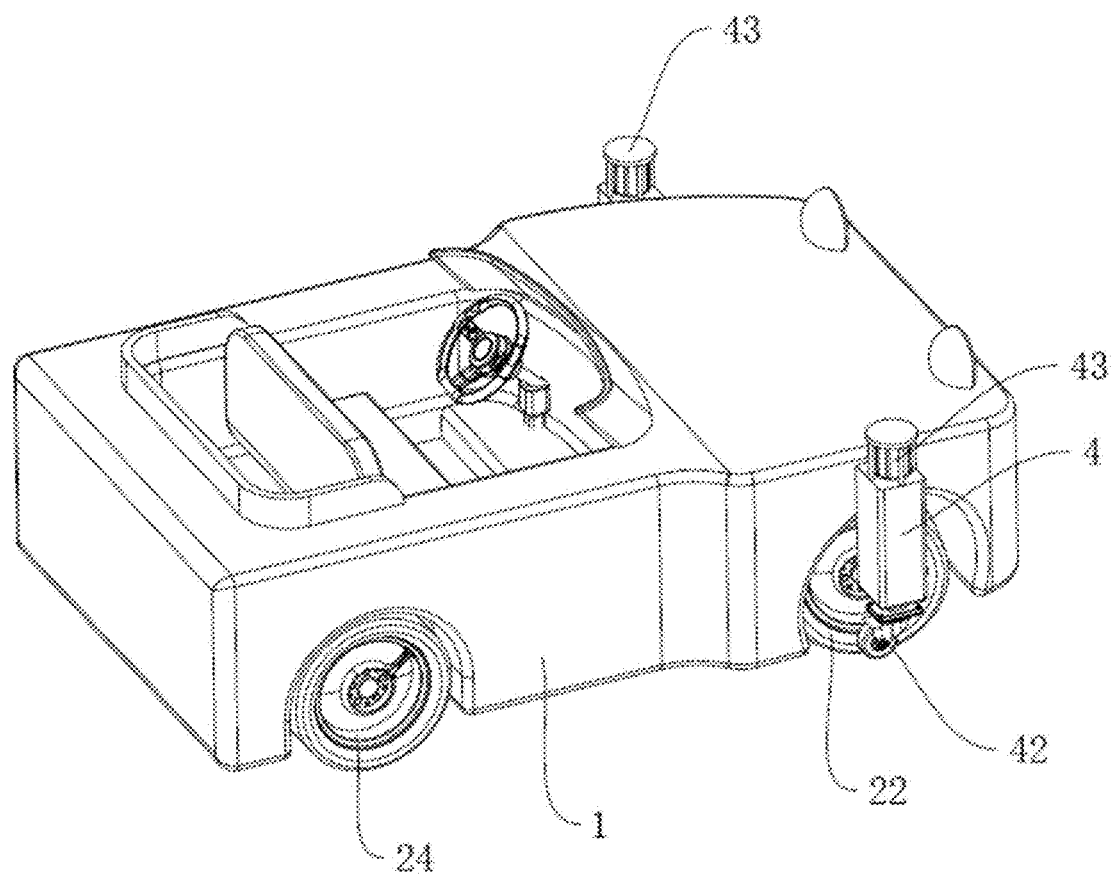
FIG. 5 is an overall structural diagram of Embodiment 5 of the present application.
Figure 6:
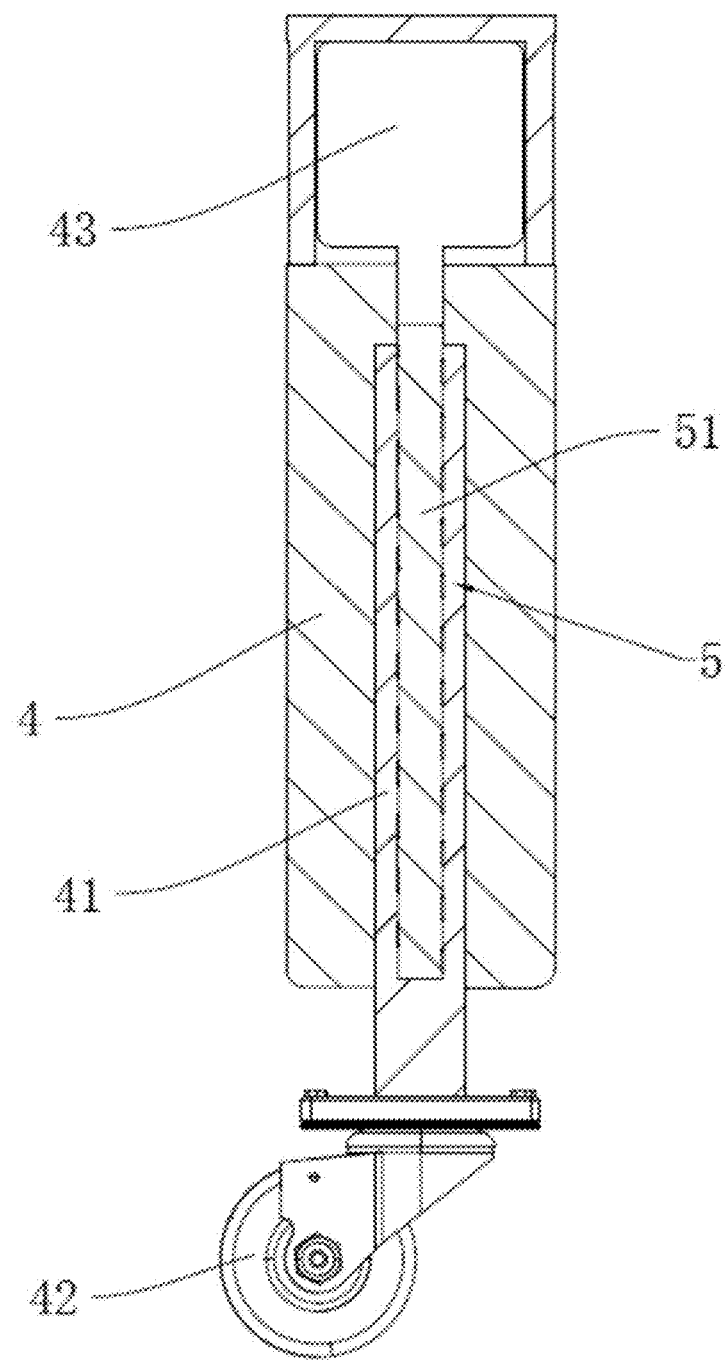
FIG. 6 is a sectional view of the fixing block in Embodiment 5 of the present application.

Referring to FIG. 5 and FIG. 6, the difference between this embodiment and Embodiment 1 is that the car body 1 is welded with vertical fixing blocks 4 on both sides thereof respectively, which are provided at sides of the left front wheel 21 and right front wheel 22 away from the center of the car body 1 respectively. In addition, when the axes of the left front wheel 21 and the right front wheel 22 are perpendicular to the car body 1, the two fixing blocks 4 are aligned with the axes of the left front wheel 21 and the right front wheel 22 respectively, so that the fixing blocks 4 do not interfere with the steering of the left front wheel 21 and the right front wheel 22. The fixing block 4 is in a hollow rectangular shape, and one end thereof facing the ground is provided as an opening. A vertical lifting block 41 slidably penetrates through the inner cavity the fixing block 4, the lifting block 41 is in a rectangle shape, and the lifting block 41 is fixedly connected to a universal wheel 42 by screw at the end thereof extending out of the opening of the fixing block 4. The fixing block 4 is fixedly connected to a supporting motor 43 on the upper surface thereof by a mounting base, in which the supporting motor 43 is servo motor. The on-board controller 31 is connected to the supporting motor 43, and the on-board controller 31 correspondingly controls on-off of the supporting motor 43 on the side of the left front wheel 21 or the right front wheel 22 according to the left or the right drift signal. The supporting motor 43 forwards when supporting motor 43 is on, and rotates reversely when off.

Referring to FIG. 6, the fixing block 4 is provided with a linkage assembly 5, which includes a screw rod 51 in rotatable connection with the fixing block 4 and through the inner cavity of the fixing block 4. The screw rod 51 is vertically arranged and is in screwed connection through the lifting block 41. The output axle of the supporting motor 43 facing downward and is fixedly connected to the upper end of the screw rod 51. Since the fixing block 4 and the lifting block 41 are both in a rectangular shape, and the four outer sides of the lifting block 41 are abutted to the four inner sides of the fixing block 4, when the supporting motor 43 drives the screw rod 51 to rotate, the universal wheel 42 is abutted against the ground, and the screw rod 51 continues to rotate until the left front wheel 21 or the right front wheel 22 is off the ground.

Figure 7:
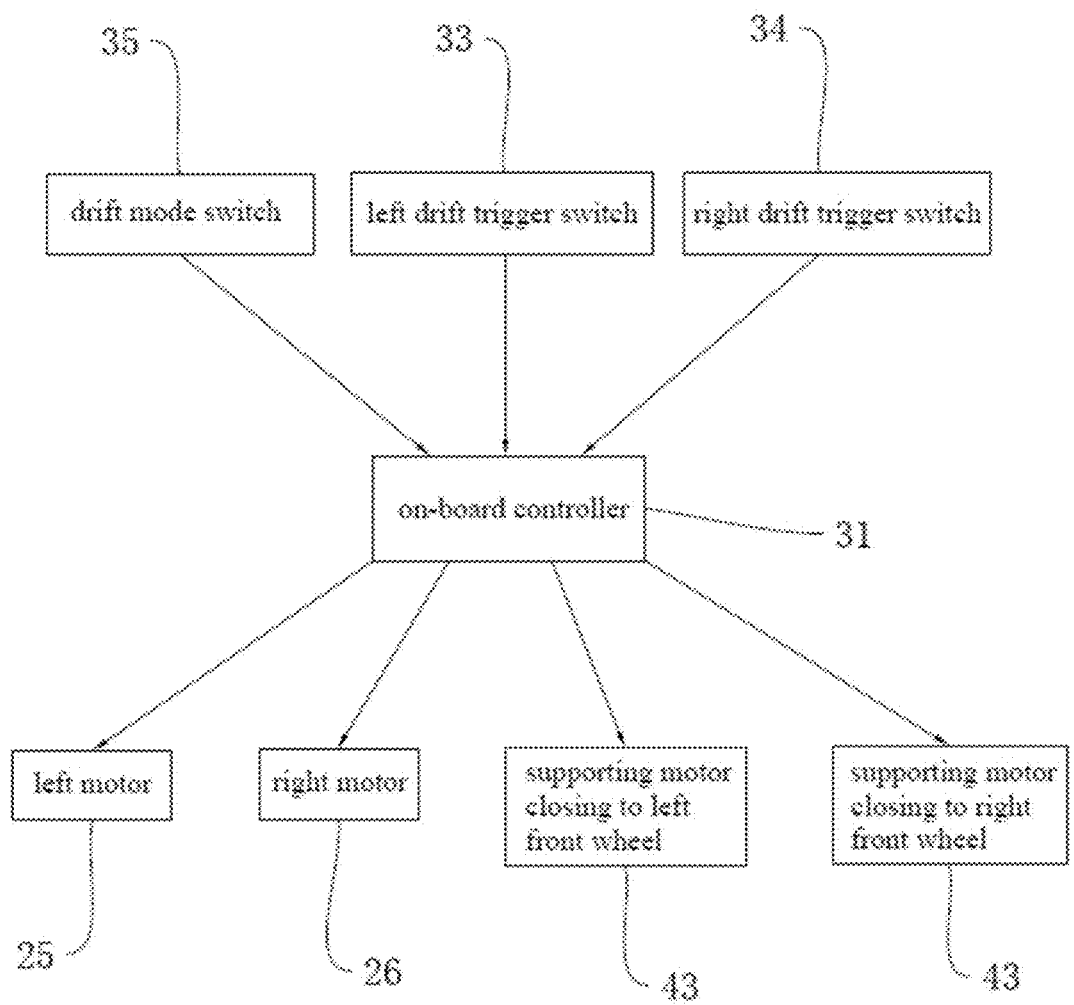
FIG. 7 is a system block diagram of the control system in Embodiment 5 of the present application.

Referring to FIG. 6 and FIG. 7, when the user triggers the right drift trigger switch 34, the on-board controller 31 controls the left motor 25 to forward and the right motor 26 to reverse. At the same time, it controls the supporting motor 43 on the side of the right front wheel 22 to turn on. The supporting motor 43 drives the screw rod 51 to rotate, so that the lifting block 41 on the side of the right front wheel 22 drives the universal wheel 42 to abut against the ground until the right front wheel 22 is off the ground, while the left front wheel 21, the left rear wheel 23 and the right rear wheel 24 are still in contact with the ground, causing the whole car body 1 to drift clockwise around the drift center point P, in which by reducing the friction between the right front wheel 22 and the ground, the drift effect of the car body 1 is better and more obvious. In addition, because the universal wheel 42 is abutted against the ground, the friction loss of the right front wheel 22 is reduced, and the service life of the right front wheel 22 is prolonged, which saves the cost.

The above are the preferred embodiments of the present application, which are not intend to limit the protection scope of the present application. Therefore, all equivalent changes made according to the structure, shape and principle of the present application should be covered within the protection scope of the present application.

What is claimed is:

1. A drift car for children, comprising: a car body, a driving system and a control system, wherein the driving system comprises a front wheel set, a rear wheel set and a motor set arranged in the car body, the front wheel set comprises a left front wheel and a right front wheel, and the rear wheel set comprises a left rear wheel and a right rear wheel, the control system comprises an on-board controller arranged in the car body, and the motor set comprises a left motor and a right motor, the left motor is connected to the left front wheel or the left rear wheel, the right motor is connected to the right front wheel or the right rear wheel, and the left and right motors are both connected to the on-board controller; the controller system further comprises a drift trigger switch connecting to the on-board controller, the drift trigger switch outputs a drift signal and the on-board controller responds to the drift signal and controls the left and right motors to rotate in opposite directions.

2. The drift car for children according to claim 1, wherein the left motor is connected to the left rear wheel and the right motor is connected to the right rear wheel.

3. The drift car for children according to claim 1, wherein the drift car comprises two left motors, and the two left motors are connected to the left front wheel and left rear wheel respectively, and the drift car comprises two right motors, and the two right motors are connected to the right front wheel and right rear wheel respectively.

4. The drift car for children according to claim 1, wherein the drift trigger switch comprises:

a left drift trigger switch, which is provided on the car body and connected to an input terminal of the on-board controller, and outputs a left drift signal; the on-board controller responds to the left drift signal and controls the left motor to rotate reversely and the right motor forwards; and a right drift trigger switch, which is provided on the car body and connected to the input terminal of the on-board controller, and outputs a right drift signal; the on-board controller responds to the right drift signal and controls the right motor to rotate reversely and the left motor forwards.

5. The drift car for children according to claim 2, wherein the drift trigger switch comprises:

a left drift trigger switch, which is provided on the car body and connected to an input terminal of the on-board controller, which outputs a left drift signal; the on-board controller responds to the left drift signal and controls the left motor to rotate reversely and the right motor forwards; and a right drift trigger switch, which is provided on the car body and connected to the input terminal of the on-board controller, and outputs a right drift signal; the on-board controller responds to the right drift signal and controls the right motor to rotate reversely and the left motor forwards.

6. The drift car for children according to claim 3, wherein the drift trigger switch comprises:

a left drift trigger switch, which is provided on the car body and connected to the input terminal of the on-board controller, and outputs a left drift signal; the on-board controller responds to the left drift signal and controls the left motor to rotate reversely and the right motor forwards; and a right drift trigger switch, which is provided on the car body and connected to the input terminal of the on-board controller, and outputs a right drift signal; the on-board controller responds to the right drift signal and controls the right motor to rotate reversely and the left motor forwards.

7. The drift car for children according to claim 1, wherein the drift trigger switch comprises:

a remote control, wirelessly adapted and connected to the on-board controller, the remote control comprises a left drift remote button, which outputs a left drift remote signal and the on-board controller responds to the left drift remote signal and controls the left motor to rotate reversely and the right motor forwards, and the remote control further comprises a right drift remote button, which outputs a right drift remote signal and the on-board controller responds to the right drift remote signal and controls the right motor to rotate reversely and the left motor forwards.

8. The drift car for children according to claim 1, wherein the car body comprises a drift mode switch, which is connected to the on-board controller and is used for outputting a drift mode switching signal, and the on-board controller responds to the drift mode switching signal and judges whether to respond to the drift signal from the drift trigger switch.

9. The drift car for children according to claim 2, wherein two sides of the car body are fixedly connected with fixing blocks respectively, and the two fixing blocks are positioned at sides of the left and right front wheels away from the center of the car body respectively; the fixing block is hollow and has an opening at one end facing the ground; a lifting block slidably penetrates through an inner cavity of the fixing block, and a universal wheel is fixedly connected at the end of the lifting block extending out of the opening of the fixing block, the fixing block is fixedly connected to a supporting motor, the fixing block is provided with a linkage assembly, the supporting motor is connected to the linkage assembly, the linkage assembly is connected to the lifting block and the on-board controller is connected to the supporting motor, the corresponding supporting motor is controlled to be on or off according to the drift signal, the universal wheel is driven by the linkage assembly to abut against the ground until the left or right front wheel is off the ground.

10. The drift car for children according to claim 9, wherein the linkage assembly comprises a screw rod rotatably penetrating through the inner cavity of the fixing block, the output axle of the supporting motor is fixedly connected to the screw rod, the screw rod threadingly penetrates through the lifting block, the fixing block and the lifting block are both rectangle-shaped, and an outer wall of the lifting block is abutted to an inner wall of the fixing block.

* * * * *